United States Patent
Teng et al.

(10) Patent No.: US 7,583,752 B2
(45) Date of Patent: Sep. 1, 2009

(54) TRANSMITTER FOR OUTPUTTING DIFFERENTIAL SIGNALS OF DIFFERENT VOLTAGE LEVELS

(75) Inventors: Kuei-Chun Teng, Hsin-Chu Hsien (TW); Shin-Lin Wang, Hsin-Chu (TW)

(73) Assignee: Faraday Technology Corp., Hsin-Chu (TW)

( * ) Notice: Subject to any disclaimer, the term of this patent is extended or adjusted under 35 U.S.C. 154(b) by 353 days.

(21) Appl. No.: 11/559,364

(22) Filed: Nov. 13, 2006
(Under 37 CFR 1.47)

(65) Prior Publication Data
US 2007/0263749 A1    Nov. 15, 2007

Related U.S. Application Data

(63) Continuation-in-part of application No. 10/064,972, filed on Sep. 5, 2002, now abandoned.

(51) Int. Cl.
*H04L 27/04* (2006.01)
*H03F 3/45* (2006.01)
*G03F 3/45* (2006.01)

(52) U.S. Cl. .......... 375/295; 327/52; 327/359; 330/252; 330/261

(58) Field of Classification Search .......... 375/257, 375/295; 327/52, 53, 89, 96, 127, 246, 266, 327/274, 280, 287, 359, 363; 330/252, 253, 330/257, 261
See application file for complete search history.

(56) References Cited

U.S. PATENT DOCUMENTS

| | | | |
|---|---|---|---|
| 5,959,601 A | * | 9/1999 | Ho et al. .......... 345/98 |
| 5,977,797 A | | 11/1999 | Gasparik |
| 6,028,467 A | | 2/2000 | Burrows et al. |
| 6,429,700 B1 | * | 8/2002 | Yang .......... 327/108 |
| 6,531,896 B1 | * | 3/2003 | Song .......... 326/86 |
| 6,670,828 B2 | | 12/2003 | Ramaswamy |
| 6,747,483 B2 | | 6/2004 | To et al. |
| 6,999,518 B1 | * | 2/2006 | Huang .......... 375/259 |
| 2002/0106031 A1 | | 8/2002 | Ebuchi et al. |
| 2002/0158833 A1 | * | 10/2002 | Ho et al. .......... 345/100 |
| 2003/0193350 A1 | * | 10/2003 | Chow .......... 326/83 |
| 2003/0198296 A1 | * | 10/2003 | Bonelli et al. .......... 375/257 |

FOREIGN PATENT DOCUMENTS

| | | |
|---|---|---|
| EP | 1 353 484 A2 | 10/2003 |
| JP | 2003-333109 | 11/2003 |

* cited by examiner

*Primary Examiner*—Young T. Tse
(74) *Attorney, Agent, or Firm*—Winston Hsu (57) ABSTRACT

A differential signal transmitter including a driver circuit that generates a differential signal in response to data input. The amplitude of the voltage swings in the differential circuit is controlled by an electrical bias. Two data inputs, one being the original Data and the other being Data bar, are connected to the transistors and cause the required signal swings. The transmitter further includes a control circuit with an input for a single-bit control line for adjusting the bias to produce different swing amplitudes according to a control indicator inputted from the control line. The control circuit inputs one or more current sources and outputs the sum of one or more of the current sources according to the control indicator and the outputted current is used as the electrical bias.

18 Claims, 6 Drawing Sheets

TRANSMITTER FOR OUTPUTTING DIFFERENTIAL SIGNALS OF DIFFERENT VOLTAGE LEVELS

CROSS REFERENCE TO RELATED APPLICATIONS

This application is a Continuation-In-Part of U.S. patent application Ser. No. 10/064,972, filed on Sep. 5, 2002, now abandoned.

BACKGROUND OF THE INVENTION

1. Field of the Invention

The present invention relates to a transmitter for differential signaling. More specifically, a transmitter for differential signaling outputting selectable low-voltage currents is disclosed.

2. Description of the Prior Art

Swing differential signaling is a low-voltage technology used in data transmission systems. The use of low-voltage differential signaling for data transmission has grown rapidly due to the low power dissipation, high signal-to-noise ratio, low EMI emission, and high transmission speed characteristics inherent in such a system. Today's differential signaling systems usually have a swing, or peak-to-peak amplitude of 600 mv or less, depending on the particular derivation in use.

Figure 1:
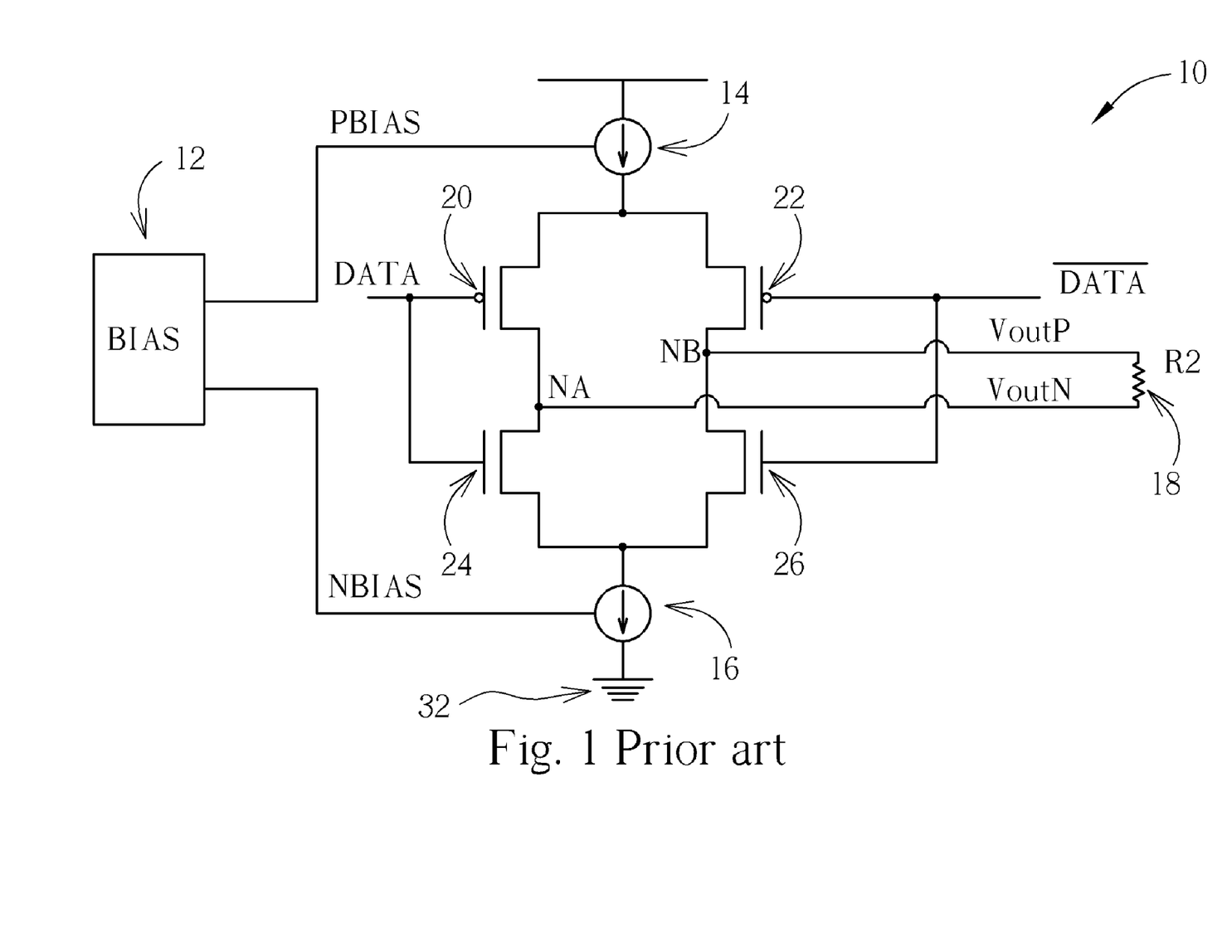
FIG. 1 is a simple circuit diagram of a differential signal transmitter according to the prior art.

Please refer to FIG. 1 that is a simple circuit diagram of a prior art differential signaling transmitter 10. Transmitter 10 comprises a bias 12 regulating two electrical sources 14, 16, a ground 32, two transistors 24, 26, two inverted transistors 20, 22, and a resistor 18 (R2). Transmitter 10 also comprises two inputs, a first input for data and a second input for inverted data (data bar).

The bias 12 controls the inputted current of the current source 14 to fall within a specified range. When the inputted data is high (thus data bar is low) transistors 24 and 22 are turned on allowing current to flow from the current source 14 through transistor 22 to a node NB. From the Node NB, the current VoutP flows to the resistor 18. From the resistor 18, the current VoutN flows to a node NA and through the transistor 24 and the current source 16 to the ground 32. When the inputted data is low (thus data bar is high) transistors 20 and 26 are turned on allowing current to flow from the current source 14 through transistor 20 to the node NA. From the node NA, the current VoutN flows to the resistor 18 (R2). From the resistor 18, the current VoutP flows to the ground 32 via the node NB, the transistor 26, and the current source 16. The outputted voltage when data is high is equal to VoutP−VoutN which equals I*R2 and corresponds to a "1" in the differential signal. The outputted voltage when data is low is equal to VoutP−VoutN which equals −I*R2 and corresponds to a "0" in the differential signal.

Currently there are at least three major types of swing differential signaling systems commonly used. First, is a Low Voltage Differential Signaling (LVDS) system with signal swings in the 247 mv-454 mv range. A swing of 350 mv would be considered typical for LVDS. Next is a Mini-LVDS system with signal swings in the 300 mv-600 mv range, typically about 450 mv. Thirdly, a Reduced Swing Differential Signaling (RSDS™) system generally supports a signal swing of 200 mv but includes a signal swing range of 100 mv-400 mv.

The benefits provided by a low-voltage differential signaling transmitter 10 can be offset when different applications within the same system require different swing voltage levels. The choice of which kind of differential signaling transmitter 10 to use is related to numerous design considerations including bandwidth required, length of the connection, driver transition time, and signal quality, all of which are application specific and often incompatible with each other. In such a scenario, system designers or administrators are faced with a choice of decreased efficiency or the cost and complications additional transmitters 10 for each voltage range needed.

SUMMARY OF THE INVENTION

It is therefore a primary objective of the claimed invention to provide a differential signal transmitter that can be efficiently used with a plurality of differential signal applications each requiring a different swing voltage range, reducing costs and increasing functional efficiency.

Briefly summarized, the claimed invention discloses a differential signal transmitter including a driver circuit that generates a differential signal in response to data input. The amplitude of the voltage swings in the differential signal is controlled by an electrical bias to the driver circuit. Two data inputs, one being the original data and the other being data bar, are connected to the transmitter and cause a pair of differential signals with the required signal swings.

The claimed invention further includes a control circuit with an input for a single-bit control line for adjusting the bias to produce different swing amplitudes according to a control indicator inputted from the control lines. The control circuit inputs one or more current sources and outputs the sum of one or more of the current sources according to the control indicator and the outputted current is used as the electrical bias for the driver circuit. For example, if the control indicator is set high, the control circuit outputs a current level that is used as a bias to produce a differential signal with a first predefined voltage amplitude. If the control indicator is set low, the control circuit outputs a second current level that is used as a bias to produce a differential signal with a second predefined voltage amplitude.

Another example of the claimed invention works similarly to the above example except that the control circuit receives a plurality of control bits via one or more control lines and adjusts the bias to produce a plurality of differential swing current amplitudes according to the control indicators received by the control circuit.

It is an advantage of the claimed invention that a single differential signal transmitter can be adjusted to produce a plurality of differential swing current amplitudes according to the control indicators received by the control circuit, eliminating a need for separate transmitters for each different kind of differential signal required in different applications. The claimed invention thereby reduces costs and increases functional efficiency.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
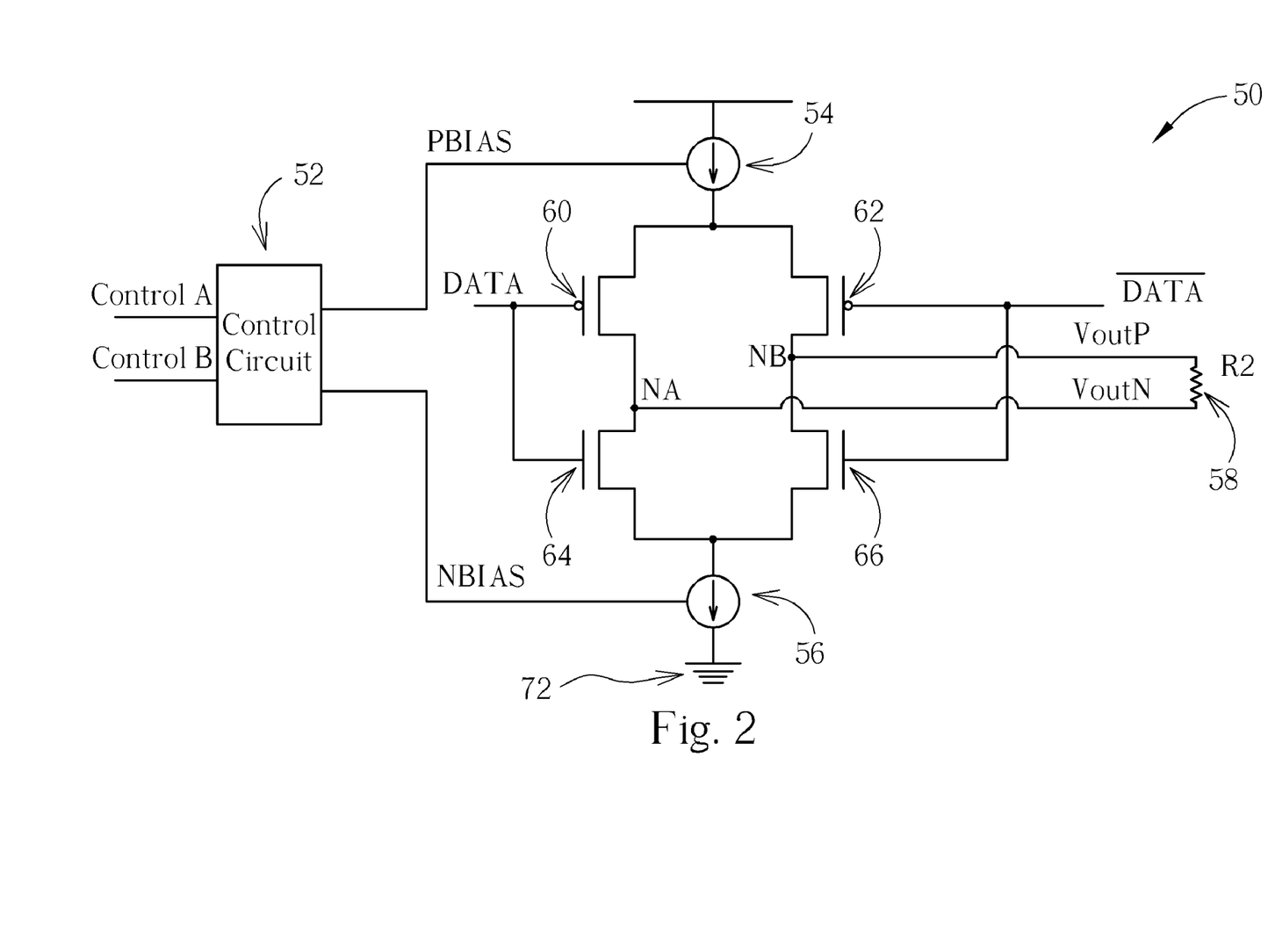
FIG. 2 is a simple circuit diagram of a differential signal transmitter according to the present invention.

Please refer to FIG. 2 of a differential signal transmitter according to the present invention. The transmitter comprises a control circuit 52 and a driver circuit 50 including two electrical sources 54, 56, a ground 72, two transistors 64, 66, two inverted transistors 60, 62, and a resistor 58(R2). The driver circuit 50 also comprises two inputs, the first input receives data and a second input receives inverted data (data bar). The operation of the basic driver circuit 50 of the present invention is well known in the art and functionally similar to the prior art described above.

The bias supplied by the control circuit 52 controls the inputted current of the current source 54 to fall within a specified range. When the inputted data is set high (thus data bar is set low) transistors 64 and 62 are turned on allowing current to flow from the current source 54 through transistor 62 to a node NB. From the node NB, the current VoutP flows to the resistor 58. From the resistor 58, the current VoutN flows to a node NA and through the transistor 64 and the current source 56 to the ground 72. When the inputted data is low (thus data bar is high) transistors 60 and 66 are turned on allowing current to flow from the current source 54 through transistor 60 to the node NA. From the node NA, the current VoutN flows to the resistor 58. From the resistor 58, the current VoutP flows to the ground 72 via the node NB, the transistor 66, and the current source 56. The outputted current when data is high is equal to VoutP−VoutN which equals I*R2 and corresponds to a "1" in the differential signal. The outputted current when data is low is equal to VoutP−VoutN which equals −I*R2 and corresponds to a "0" in the differential signal.

Figure 3:
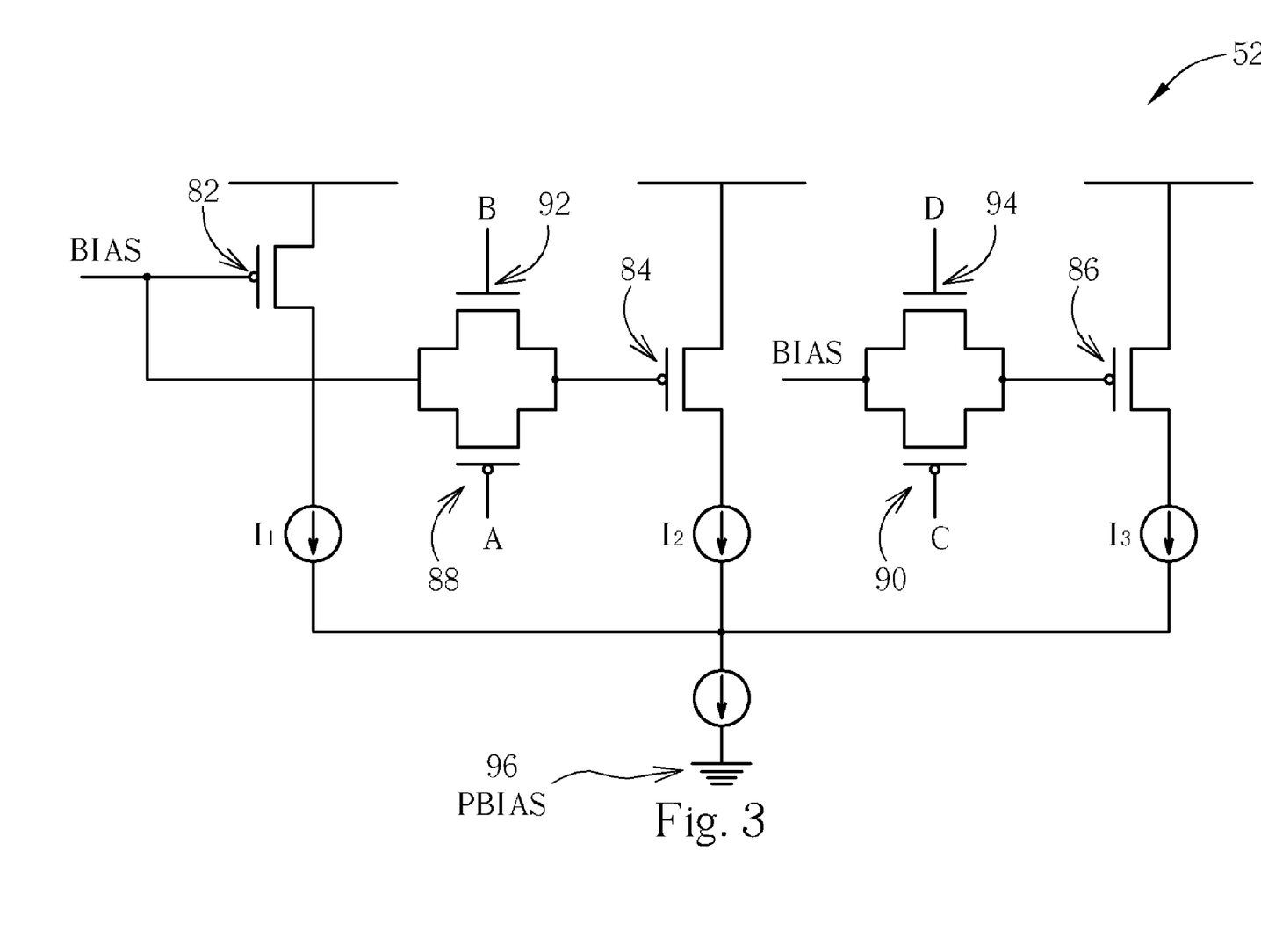
FIG. 3 is a simple circuit diagram of a control circuit of the differential signal transmitter of FIG. 2.

FIG. 3 is a simple circuit diagram of an example control circuit 52 according to the present invention. It is understood that there are numerous ways to implement a control circuit for the present invention and FIG. 3 is merely an illustration of only one possible control circuit. The spirit of the present invention applies to any method of using one or more control indicators to combine one or more current sources and output the combined current to be used as an electrical bias for a differential signal driver.

The control circuit 52 comprises transistors 92, 94, inverted transistors 82, 84, 86, 88, 90, three current sources I1, I2, I3, a ground 96, and an electrical bias PBIAS. In this example, the ground 96 is to be used as a bias for the driver circuit 50. In addition, in this example, the control circuit 52 comprises four inputs A, B, C, D, for receiving control indicators to control the current outputted to the ground 96. It is obvious that a single control indicator can be used to select between two outputted current levels and the present invention is not to be limited by the number of control indicators used. In this example, four control indicators are used for convenience to illustrate a useful application of the present invention.

In operation, the control circuit 52 will function according to the inputted control indicators. In a first example, the control indicators received by the control circuit are as follows: A=0, B=1, C=1, D=0. This scenario turns on transistors 88, 92 while transistors 90, 94 are turned off and results in a total current at the ground 96 equal to I1+I2. In another example, the control indicators received by the control circuit are as follows: A=1, B=0, C=0, D=1. Here, transistors 90, 94 are turned on while transistors 88, 92 are turned off, resulting in a total output current equal to I1+I3. Obviously, other combinations of control indicators result in different resulting output current.

If the current sources I1, I2, I3 are properly chosen, the sum of currents of one or more current sources can be used as a bias to cause the driver circuit 50 to generate a differential signal in a predetermined voltage range. As the embodiment shown in FIG. 2, the summed current (summing I1 and/or I2 and/or I3) flowing through ground 96 can form the bias PBIAS for biasing the current source 54, such that the current provided by current source 54 can vary according to PBIAS. Similarly, the bias NBIAS for current source 56 can be provided using a way similar to FIG. 2, or the NBIAS can be the PBIAS, with the current sources 54/56 formed by a current mirror which mirrors PBIAS (and/or NBIAS). The voltage range generated can be altered merely by changing one or more of the control indicators A, B, C, D. For example, the sum of the currents I1 and I2 (as in the first example) can generate a Low Voltage Differential Signaling (LVDS) differential signal with signal swings in the 247 mv-454 mv range. A Mini-LVDS differential signal with signal swings in the 300 mv-600 mv range can be generated by adjusting the control indicators A, B, C, D appropriately, say to sum currents I1 and I3 (as in the second example). Other combinations of the control indicators A, B, C, D can be used to generate a Reduced Swing Differential Signaling (RSDS™) differential signal with a signal swing in the range of 100 mv-400 mv.

Figure 4:
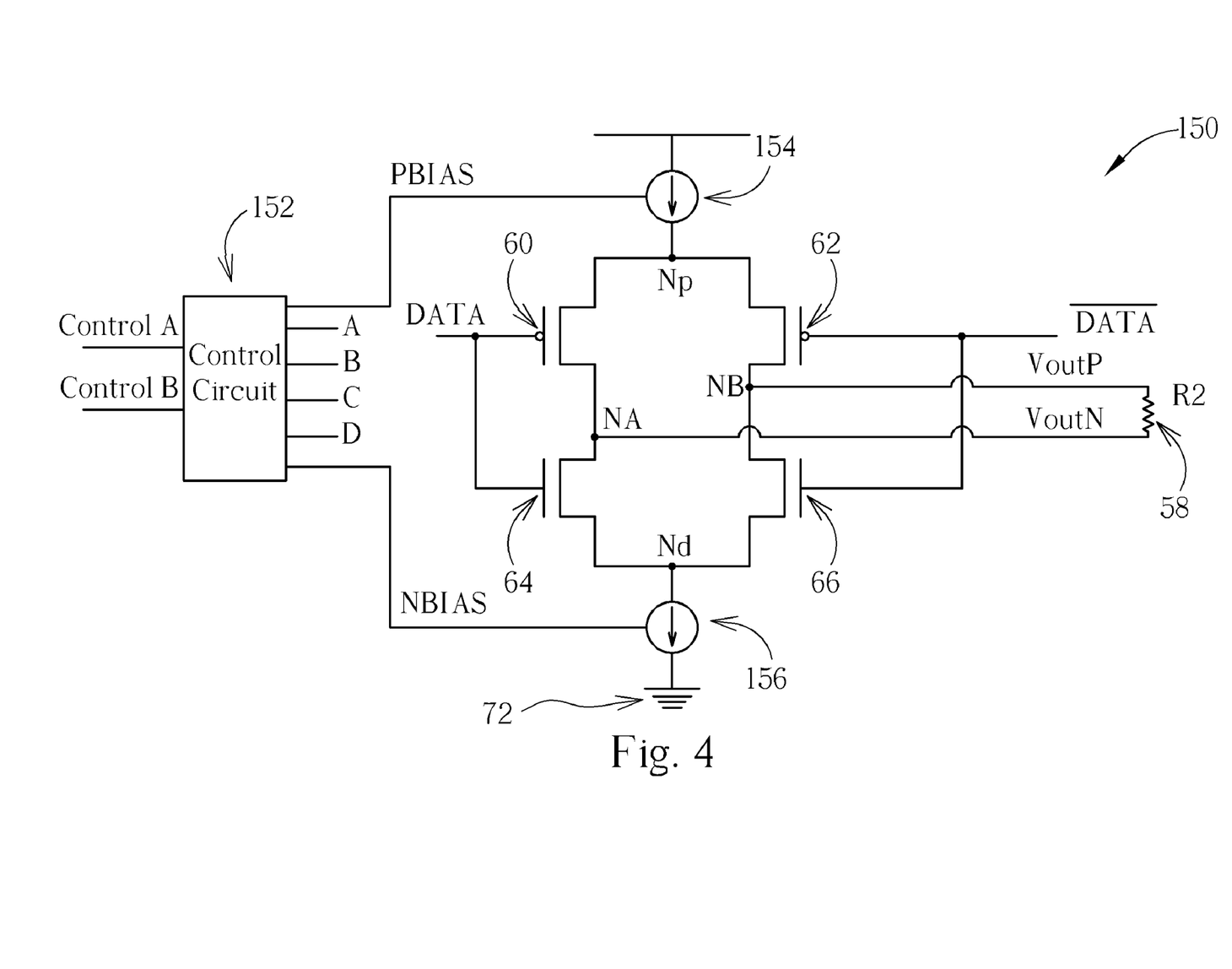
FIG. 4 is a simple circuit diagram of another differential signal transmitter according to the present invention.

Another manner of achieving the same goal of a transmitter outputting differential signals at different voltage levels is shown in FIG. 4. Similar numbered components in the driver circuit 150 of FIG. 4 and the driver circuit 50 shown in FIG. 2 indicate similar connections and functionality. There are two major differences between the driver circuit 150 and the driver circuit 50; a control circuit 152 and current source circuits 154/156.

Figure 5:
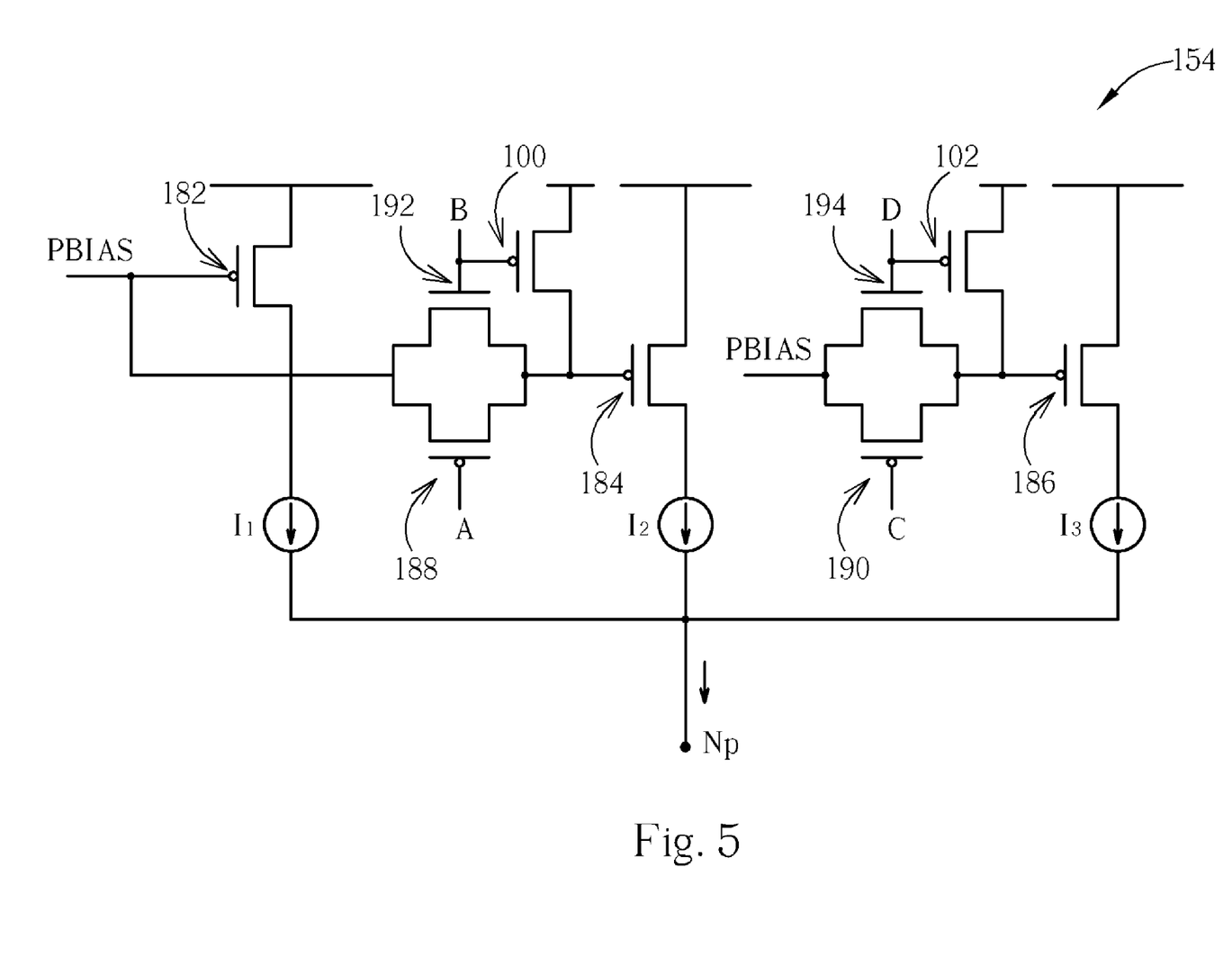
FIG. 5 is a simple circuit diagram of a current source circuit of the differential signal transmitter of FIG. 4.
Figure 6:
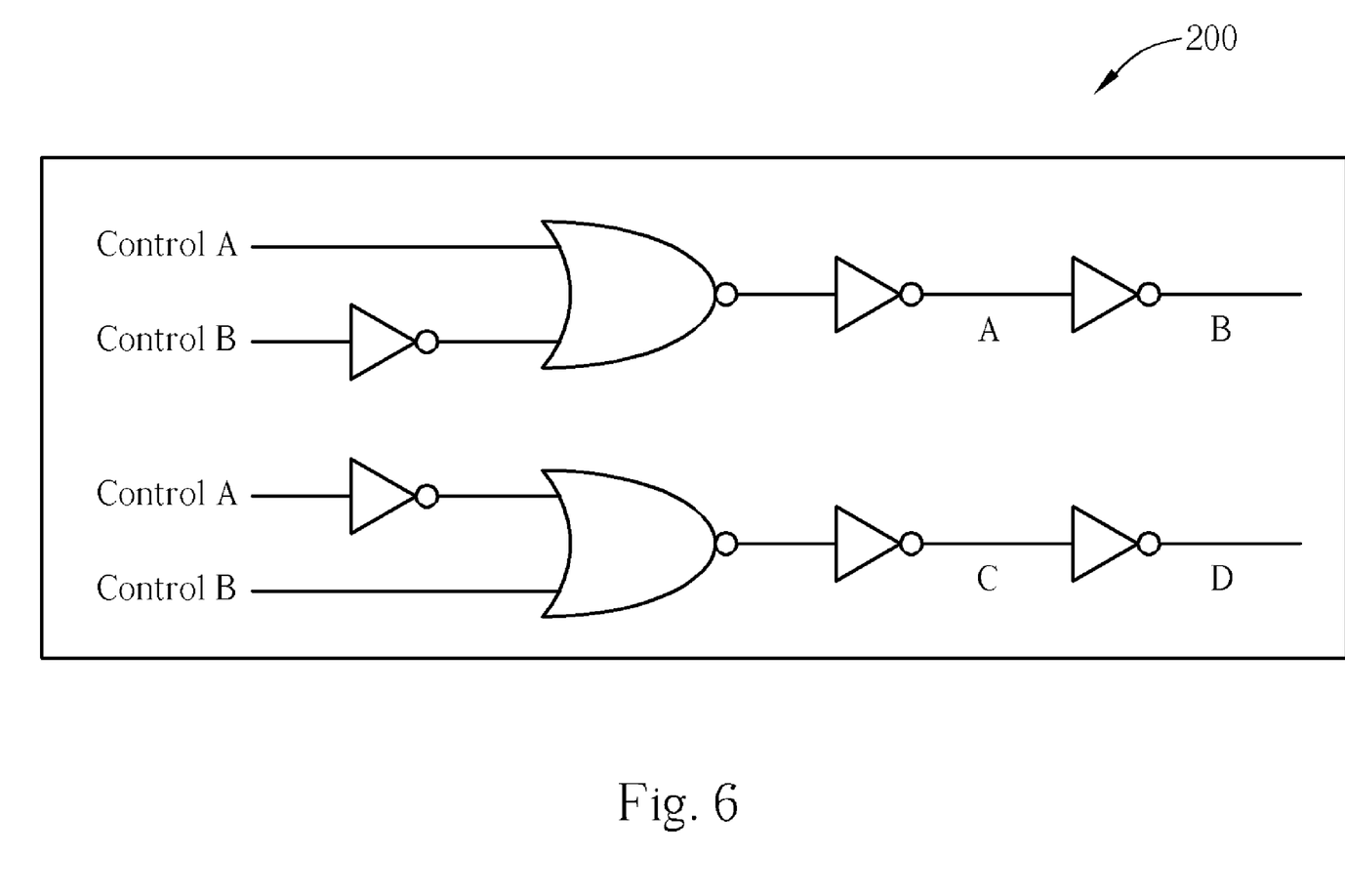
FIG. 6 is an example circuit showing how control signals A-D can be derived from signals Control A and Control B.

The control circuit 152 comprises at least one input for receiving signals Control A and Control B from which the control circuit 152 derives and outputs corresponding signals A-D. One such method of derivation is shown in FIG. 6 where a NOR gate and inverters serially connected produce the same control indicators A-D discussed in the first embodiment of the disclosure when given similar Control A and Control B signals. The control circuit 152 outputs PBIAS and the control indicators A-D to the current source circuit 154, which is depicted in FIG. 5.

The current source circuit 154 comprises transistors 192, 194, inverted transistors 182, 184, 186, 188, 190, three current sources I1, I2, I3, and a node Nd. In this example, the current source circuit 154 comprises an input for receiving a constant PBIAS (such as a constant voltage level) and four inputs A, B, C, D, for receiving the control indicators A-D outputted by the control circuit 152 to control the current outputted to the ground 196. It is obvious that a single control indicator can be used to select between two outputted current levels and the present invention is not to be limited by the number of control indicators used. In this example, four control indicators are used for convenience to illustrate a useful application of the present invention.

One difference between the current source circuit 154 and the similar circuitry of the previous embodiment is the addition of the inverted transistors 100 and 102. Gates of the transistors 100 and 102 are respectively coupled to the input B and the input D for receiving the corresponding control indicator B, D. A source of each of the transistors 100 and 102 is connected to a current source and a drain of each of the transistors 100 and 102 is respectively coupled to gates of transistors 184 and 186. These transistors 100 and 102 have been added to ensure that transistors 184 and 186 are never left floating and are fully controlled by the control signals A-D.

In operation, the current source circuit 154 will function according to the inputted control indicators. As before, in a first example, the control indicators received by the current source circuit 154 are as follows: A=0, B=1, C=1, D=0. This scenario turns on transistors 188, 192 while transistors 186, 190, 194 are turned off and results in a total current at the Node Np equal to I1+I2. In another example, the control indicators received by the current source circuit 154 are as follows: A=1, B=0, C=0, D=1. Here, transistors 190, 194 are turned on while transistors 184, 188, 192 are turned off, resulting in a total output current equal to I1+I3. Obviously, other combinations of control indicators result in different resulting output current. As the operation implies, the transistors 192/188 (which form a transmission gate) can be thought as a switch unit for controlling (gate) biasing of a current unit formed by transistor 184. Similarly, the other switch unit formed by transistor 190/194 controls biasing of a current unit of transistor 186.

If the current sources I1, I2, I3 are properly chosen, the sum of currents of one or more current sources can be used as a bias to cause the driver circuit 150 to generate a differential signal in a predetermined voltage range. The voltage range generated can be altered merely by changing one or more of the control indicators A, B, C, D. For example, the sum of the currents I1 and I2 (as in the first example) can generate a Low Voltage Differential Signaling (LVDS) differential signal with signal swings in the 247 mv-454 mv range. A Mini-LVDS differential signal with signal swings in the 300 mv-600 mv range can be generated by adjusting the control indicators A, B, C, D appropriately, say to sum currents I1 and I3 (as in the second example). Other combinations of the control indicators A, B, C, D can be used to generate a Reduced Swing Differential Signaling (RSDS™) differential signal with a signal swing in the range of 100 mv-400 mv.

FIG. 5, the transistors 182, 184 and 186 can act like current sources themselves, then the current sources I1, I2 and I3 can be omitted with the transistor 182, 184 and 186 directly feeding node Np. Like the current source 154 in FIG. 5, the other current source 156 can be constructed in a similar way. The proposed current source shown in FIG. 5 has an advantage that the control signals A-D only affect the gates of transistors 184-186, such that the current varying control mechanism will not cause interference (such as lowering signal bandwidth, introducing extra delay and noise) in the main signal path, i.e., the current path through node Np.

The present invention has a clear advantage over the prior art by using a control circuit and control indicators to permit a single transmitter to generate different leveled electrical biases for a differential driver circuit. This allows a single transmitter to selectively generate LVDS, Mini-LVDS, and RSDS™ differential signals as well as being able to easily accommodate any future versions of differential signaling.

The present invention offers the benefits of the prior art, that of low power dissipation, high signal-to-noise ratio, low EMI emission, and high transmission speed while eliminating the prior art drawbacks that can result in inefficiency and extra costs when more than one low-voltage differential voltage range is needed. The present invention offers a solution to the compatibility problem.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A differential signal transmitter comprising:
   a driver circuit that generates a differential signal in response to inputted data, a voltage amplitude of the differential signal being controlled by a bias; and
   a control circuit comprising inputs for receiving control indicators, the control circuit selecting a plurality of current sources according to the control indicators and outputting a sum of currents provided by the selected current sources as the bias.

2. The differential signal transmitter of claim 1 wherein each of the control indicators is a single bit.

3. The differential signal transmitter of claim 1 wherein the control circuit is capable of outputting the bias at different current levels.

4. The differential signal transmitter of claim 3 wherein when the control circuit outputs the bias at a first current level for the driver circuit, the driver circuit generates a Low Voltage Differential Signaling (LVDS) differential signal in response to the inputted data.

5. The differential signal transmitter of claim 3 wherein when the control circuit outputs the bias at a second current level for the driver circuit, the driver circuit generates a Mini-LVDS differential signal in response to the inputted data.

6. The differential signal transmitter of claim 3 wherein when the control circuit outputs the bias at a third current level for the driver circuit, the driver circuit generates a Reduced Swing Differential Signaling differential signal in response to the inputted data.

7. A method of transmitting a differential signal from a transmitter, the transmitter comprising a driver circuit that generates the differential signal in response to inputted data and a control circuit, a voltage amplitude of the differential signal being controlled by an electrical bias, the method comprising:
   receiving control indicators at inputs of the control circuit;
   generating the electrical bias from the control circuit as a sum of currents provided by a plurality of current sources selected according to the control indicators; and
   generating the differential signal at the voltage amplitude determined by the electrical bias.

8. The method of claim 7 wherein the driver circuit generates a Low Voltage Differential Signaling (LVDS) differential signal in response to the inputted data when the control circuit outputs the electrical bias at a first predetermined level.

9. The method of claim 7 wherein the driver circuit generates a Mini-LVDS differential signal in response to the inputted data when the control circuit outputs the electrical bias at a second predetermined level.

10. The method of claim 7 wherein the driver circuit generates a Reduced Swing Differential Signaling differential signal in response to the inputted data when the control circuit outputs the electrical bias at a third predetermined level.

11. A differential signal transmitter comprising:
   a driver circuit that generates a differential signal in response to inputted data, a voltage amplitude of the differential signal being controlled by a first bias;
   a control circuit comprising inputs for receiving control signals, a first output for outputting a second bias, and a plurality of second outputs for outputting a plurality of control indicators; and
   a current source circuit comprising an output, a first input coupled to the first output of the control circuit for inputting the second bias, and a plurality of second inputs respectively coupled to the second outputs of the control circuit for inputting the plurality of control indicators, the current source circuit selecting from a plurality of current sources according to the control indicators and outputting a sum of currents provided by the selected current sources as the first bias.

12. The differential signal transmitter of claim 11 wherein the current source circuit is capable of outputting the first bias at different current levels.

13. The differential signal transmitter of claim 12 wherein when the current source circuit outputs the first bias at a first current level for the driver circuit, the driver circuit generates a Low Voltage Differential Signaling (LVDS) differential signal in response to the inputted data.

14. The differential signal transmitter of claim 12 wherein when the current source circuit outputs the bias at a second current level for the driver circuit, the driver circuit generates a Mini-LVDS differential signal in response to the inputted data.

15. The differential signal transmitter of claim 12 wherein when the current source circuit outputs the bias at a third current level for the driver circuit, the driver circuit generates a Reduced Swing Differential Signaling differential signal in response to the inputted data.

16. The differential signal transmitter of claim 12, wherein the current source circuit comprises a plurality of first transistors, a drain of each of the plurality of first transistors coupled to the output of the current source circuit, a gate of one transistor of the plurality of first transistors coupled to the first input of the current source circuit, and gates of other transistors of the plurality of first transistors selectively coupled to the first input of the current source circuit according to the control indicators.

17. The differential signal transmitter of claim 16, wherein the current source circuit further comprises a plurality of second transistors for selectively coupling the first input of the current source circuit to the gates of the other transistors of the plurality of first transistors according to the control indicators, gates of each of the plurality of second transistors respectively coupled to one of the plurality of second inputs of the current source circuit.

18. The differential signal transmitter of claim 17, wherein the current source circuit further comprises a plurality of third transistors, a drain of each of the plurality of third transistors respectively coupled to the gates of the other transistors of the plurality of first transistors, a gate of each of the plurality of third transistors respectively coupled to one of the plurality of second inputs of the current source circuit.

* * * * *